United States Patent
Keatley

(10) Patent No.: US 9,102,371 B2
(45) Date of Patent: Aug. 11, 2015

(54) SELF ADJUSTING FIFTH WHEEL HITCH

(71) Applicant: SAF-HOLLAND, Inc., Holland, MI (US)

(72) Inventor: Justin D. Keatley, Zeeland, MI (US)

(73) Assignee: SAF-HOLLAND, Inc., Holland, MI (US)

( * ) Notice: Subject to any disclaimer, the term of this patent is extended or adjusted under 35 U.S.C. 154(b) by 81 days.

(21) Appl. No.: 13/770,397

(22) Filed: Feb. 19, 2013

(65) Prior Publication Data

US 2013/0228999 A1 Sep. 5, 2013

Related U.S. Application Data

(60) Provisional application No. 61/605,998, filed on Mar. 2, 2012.

(51) Int. Cl.
| | |
|---|---|
| *B60D 1/01* | (2006.01) |
| *B60D 1/28* | (2006.01) |
| *B62D 53/08* | (2006.01) |
| *B62D 53/10* | (2006.01) |
| *B62D 53/12* | (2006.01) |

(52) U.S. Cl.
CPC .............. *B62D 53/10* (2013.01); *B60D 1/015* (2013.01); *B60D 1/28* (2013.01); *B62D 53/08* (2013.01); *B62D 53/12* (2013.01)

(58) Field of Classification Search
CPC ........ B62D 53/08; B62D 53/10; B62D 53/12; B60D 1/015; B60D 1/28
USPC .............. 280/433–436, 504, 508, 514, 438.1
See application file for complete search history.

(56) References Cited

U.S. PATENT DOCUMENTS

| | | | | |
|---|---|---|---|---|
| 1,479,796 | A | | 1/1924 | Endebrock |
| 1,981,233 | A | * | 11/1934 | Harris ........................... 280/434 |
| 1,996,425 | A | | 4/1935 | Ketel |
| 2,317,508 | A | * | 4/1943 | Zoder ........................... 280/407 |
| 2,348,977 | A | * | 5/1944 | Ketel ............................ 280/435 |
| 2,371,750 | A | * | 3/1945 | Fontaine ....................... 280/434 |
| 2,387,625 | A | | 10/1945 | Walther et al. |
| 2,411,404 | A | | 11/1946 | Winn |
| 2,429,532 | A | * | 10/1947 | Stephen ......................... 280/436 |
| 2,469,279 | A | * | 5/1949 | Seyferth ........................ 280/435 |
| 2,515,574 | A | * | 7/1950 | Starr ............................. 280/435 |
| 2,519,090 | A | | 8/1950 | Winn |
| 2,610,069 | A | * | 9/1952 | Ketel ............................ 280/434 |
| 2,663,575 | A | * | 12/1953 | Ketel ............................ 280/435 |
| 2,772,895 | A | | 12/1956 | Steeves et al. |
| 2,788,989 | A | | 4/1957 | Davies |
| 2,811,374 | A | * | 10/1957 | Fuschi .......................... 280/432 |
| 2,833,561 | A | * | 5/1958 | Vaugoyeau ................ 280/438.1 |
| 2,907,583 | A | | 10/1959 | Dalton |
| 2,977,137 | A | * | 3/1961 | Durham ........................ 280/434 |
| 2,982,566 | A | | 5/1961 | Geerds |
| 3,013,815 | A | * | 12/1961 | Geerds .......................... 280/435 |

(Continued)

*Primary Examiner* — Anne Marie Boehler
*Assistant Examiner* — Maurice Williams
(74) *Attorney, Agent, or Firm* — Price Heneveld LLP

(57) ABSTRACT

A fifth wheel hitch includes a locking member that engages surfaces of a pair of jaws to retain the jaws in a closed position. A release handle is operably connected to the locking member whereby movement of the release handle shifts the locking member out of engagement with the jaws to permit movement of the jaws to an open position. A ratchet type mechanism retains the locking member in an engaged position relative to the jaws and compensates for wear of the components and/or differences in size between kingpins.

18 Claims, 2 Drawing Sheets

(56) References Cited

U.S. PATENT DOCUMENTS

| | | | | |
|---|---|---|---|---|
| 3,239,240 A | * | 3/1966 | Palmer | 280/434 |
| 3,314,691 A | * | 4/1967 | Georgi | 280/434 |
| 3,318,616 A | * | 5/1967 | Fontaine et al. | 280/434 |
| 3,442,533 A | | 5/1969 | Walther | |
| 3,485,513 A | * | 12/1969 | Walther | 280/435 |
| 3,632,145 A | * | 1/1972 | Davis et al. | 410/64 |
| 3,640,549 A | | 2/1972 | Neff et al. | |
| 3,787,076 A | | 1/1974 | Walther et al. | |
| 3,813,114 A | * | 5/1974 | Berends | 280/434 |
| 3,844,584 A | * | 10/1974 | Fontaine | 280/434 |
| 3,876,239 A | | 4/1975 | Jackson et al. | |
| 4,008,904 A | | 2/1977 | Davies | |
| 4,106,793 A | | 8/1978 | Neff | |
| 4,185,564 A | | 1/1980 | Stoller et al. | |
| 4,208,062 A | * | 6/1980 | Maassen | 280/434 |
| 4,213,590 A | | 7/1980 | VanDyke | |
| 4,221,397 A | | 9/1980 | Holt | |
| 4,333,666 A | | 6/1982 | Hammonds | |
| 4,375,894 A | | 3/1983 | Hammonds | |
| 4,407,617 A | * | 10/1983 | Hammonds et al. | 410/59 |
| 4,428,595 A | | 1/1984 | Martin et al. | |
| 4,566,715 A | | 1/1986 | Buckley | |
| 4,572,537 A | | 2/1986 | Hattori et al. | |
| 4,592,566 A | | 6/1986 | Inoue et al. | |
| 4,659,101 A | | 4/1987 | Buckley | |
| 4,946,183 A | * | 8/1990 | Benson et al. | 280/434 |
| 4,962,945 A | * | 10/1990 | Vannoy et al. | 280/508 |
| 5,641,174 A | * | 6/1997 | Terry et al. | 280/434 |
| 5,876,055 A | * | 3/1999 | Fontaine | 280/437 |
| 5,988,665 A | * | 11/1999 | Terry et al. | 280/434 |
| 6,095,544 A | | 8/2000 | Flater | |
| 6,736,420 B2 | * | 5/2004 | Laarman et al. | 280/438.1 |
| 7,152,869 B2 | | 12/2006 | Dupay et al. | |
| 7,240,913 B2 | * | 7/2007 | Kahrs et al. | 280/433 |

* cited by examiner

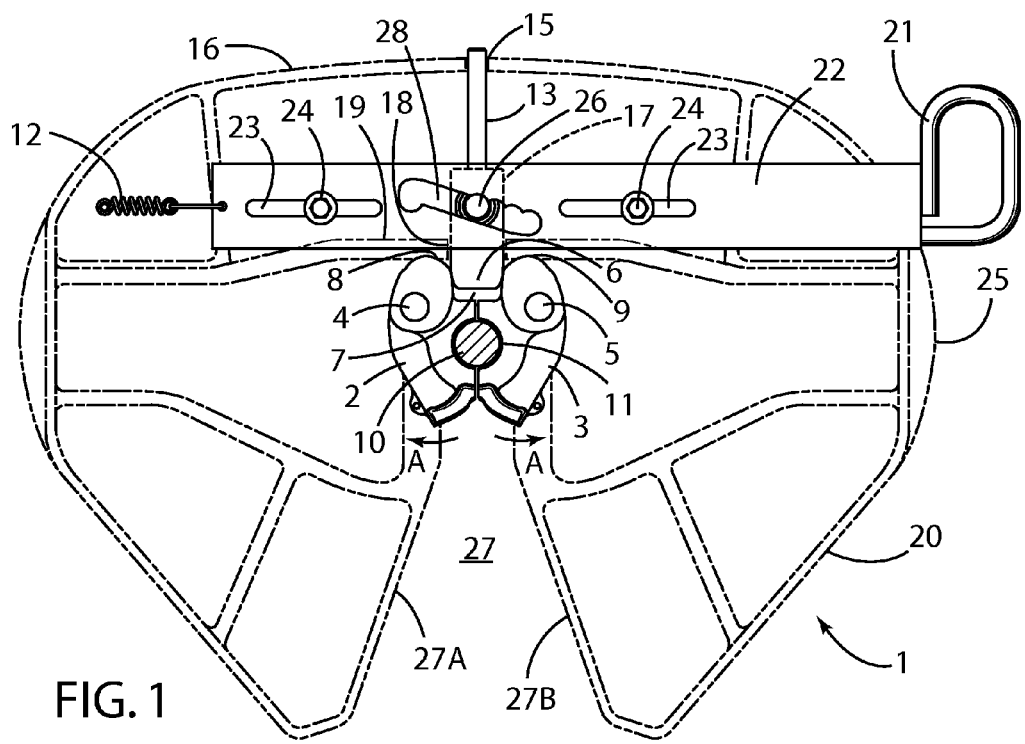
FIG. 1
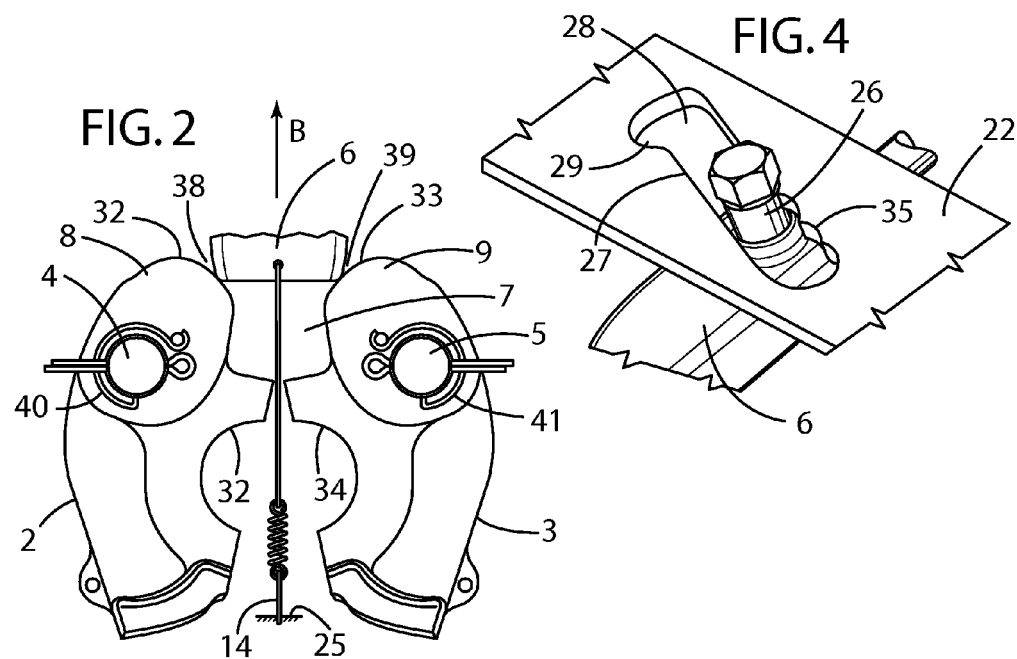
FIG. 2
FIG. 4

SELF ADJUSTING FIFTH WHEEL HITCH

CROSS REFERENCE TO RELATED APPLICATIONS

This application claims the benefit of U.S. provisional patent application No. 61/605,998 filed on Mar. 2, 2012, entitled "SELF ADJUSTING FIFTH WHEEL HITCH," the entire contents of which is incorporated by reference.

BACKGROUND OF THE INVENTION

Various types of fifth wheel hitches have been developed to releasably couple a king pin to a fifth wheel hitch. Over time, the components of fifth wheel hitches tend to wear. Such wear may result in a loose connection between the kingpin and the hitch.

BRIEF DESCRIPTION OF THE FIGURES

FIG. 1 is a plan view of a fifth wheel hitch according to one aspect of the present invention;

FIG. 2 is a partially fragmentary, enlarged view of a portion of the hitch of FIG. 1 showing the jaws in an open position;

FIG. 4 is a partially fragmentary isometric view of a portion of the hitch of FIG. 1.

DETAIL DESCRIPTION OF THE PREFERRED EMBODIMENT

Figure 3:
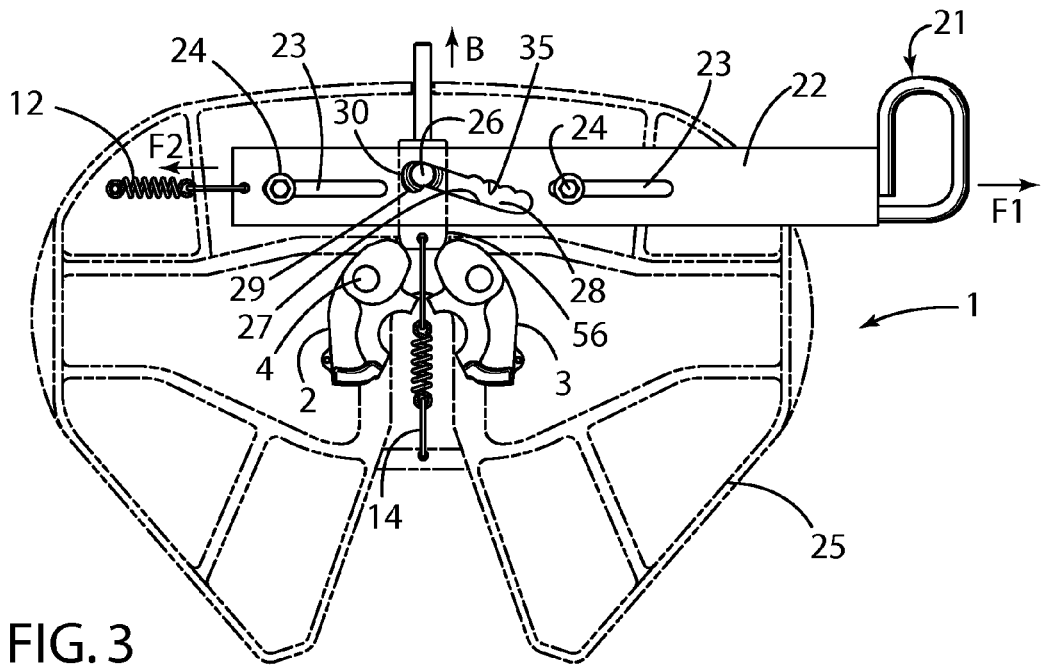
FIG. 3 is a plan view of the hitch of FIG. 1 showing the hitch is in a ready to couple position.
Figure 5:
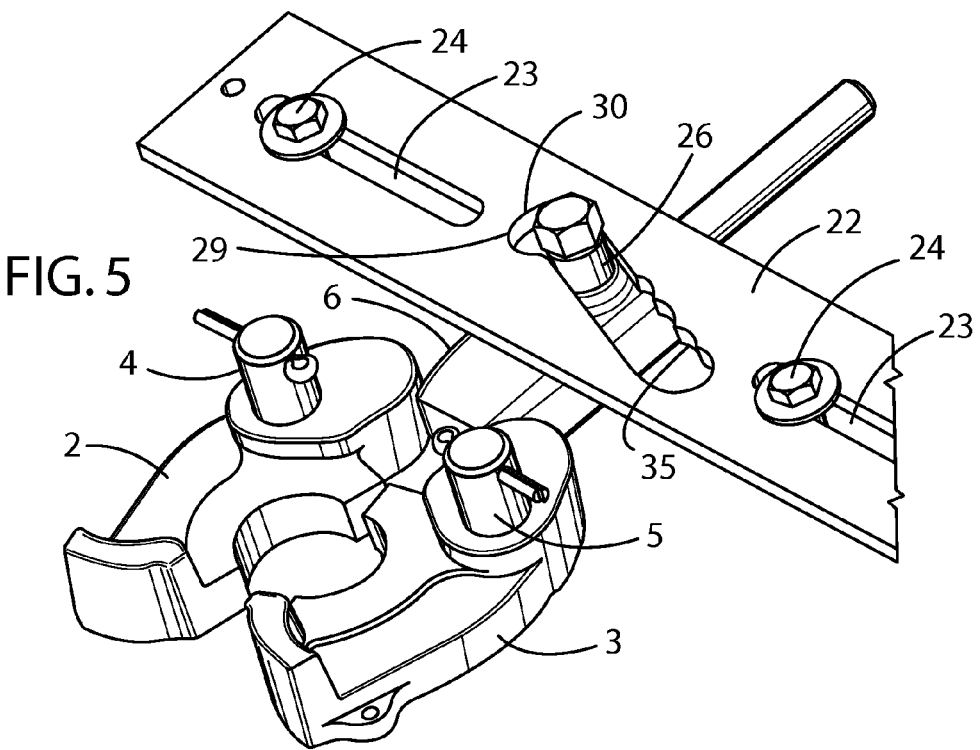
FIG. 5 is a partially fragmentary isometric view of a portion of the hitch of FIG. 1.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a fifth wheel hitch 1 includes first and second jaws 2 and 3 that are pivotally mounted to a primary structure or hitch plate 25 via first and second pivot pins 4 and 5, respectively. Hitch plate 25 includes an outer peripheral surface 20 and a throat 27 region defined by tapered side surfaces 27A and 27B. A first locking lobe 8 is formed on first jaw 2, and a second locking lobe 9 is formed on second jaw 3 (see also FIG. 2). When the jaws 2 and 3 are in the closed position illustrated in FIG. 1, a locking wedge 6 is received in an open area 7 formed between first and second locking lobes 8 and 9, respectively. Locking wedge 6 includes an elongated portion 13 that is slidably received in an opening 15 in a sidewall 16 of primary structure 25. Body portion 17 of locking wedge 6 is slidably received in an opening 18 in a reinforcing rib structure 19 of primary structure 25. When hitch 1 is in the closed position the jaws 2 and 3 together form a circular or cylindrical opening 10 that receives a kingpin 11 of a trailer, and the locking wedge 6 contacts the locking lobes 8 and 9 to prevent rotation of the jaws 2 and 3 about pins 4 and 5, respectively. As discussed in more detail below, to release hitch 1, locking wedge 6 can be moved forward in the direction of arrow "B" (FIGS. 2 and 3), thereby permitting rotation of jaws 2 and 3 about pins 4 and 5, respectively, in the direction of the arrows "A" (FIG. 1). Thus, the locking wedge 6 selectively locks the jaws 2 and 3 in the closed position of FIG. 1 to prevent inadvertent disconnecting of a fifth wheel trailer from the hitch 1.

With further reference to FIG. 3, to release hitch 1, a user pulls handle 21, thereby moving the handle 21 in the direction of the arrow "F1". A spring 12 generates a force "F2" tending to resist movement of handle 21 in the direction of the arrow "F1". Handle 21 includes a plate 22 with elongated slots 23 that receive pins 24 connected to primary structure 25 to thereby guide the handle 21 as it moves due to forces F1 and F2. As the handle 21 moves in the direction of the arrow F1, a roller/pin 26 attached to locking wedge 6 engages a side edge 27 of an angled slot 28 in plate 22, thereby shifting the locking wedge 6 in the direction of the arrow "B." This shifts the locking wedge 6 out of engagement with locking lobes 8 and 9 of jaws 2 and 3, respectively. When the handle 21 is pulled to a fully extended position, roller/pin 26 engages notch 29 at end 30 of angled slot 28 due to bias generated by a spring 14 (FIG. 1) biasing locking wedge 6 in a direction opposite the arrow B (see also FIG. 4). Notch 19 retains the locking wedge 6 in the disengaged position illustrated in FIG. 3 after handle 21 is pulled outwardly to release hitch 1.

After the handle 21 is moved to the fully extended position illustrated in FIG. 3, the kingpin 11 can be removed from between jaws 2 and 3. As the kingpin 11 is moved out, it pushes against the jaws 2 and 3, thereby rotating the jaws in the direction of the arrows A (FIG. 1) to the open position illustrated in FIG. 3. As the jaws 2 and 3 rotate open, cam surfaces 32 and 33 on locking lobes 8 and 9, respectively (FIG. 2) push against corner surfaces 38 and 39 of locking wedge 6, thereby shifting the locking wedge 6 in the direction of the arrow B. This movement of locking wedge 6 disengages roller/pin 16 from notch 19 of angled slot 18. Spring 12 generates a force F2 (FIG. 3) tending to pull handle 21 into the retracted position. However, contact between surfaces 32 and 33 of locking lobes 8 and 9, respectively, against corner surfaces 38 and 39 of locking wedge 6 prevents movement of handle 21 to the fully retracted position. Torsion springs 40 and 41 (FIG. 2) act on the jaws 2 and 3, and hold the jaws 2 and 3 open after the kingpin 11 is removed. The torsion springs 40 and 41 do not, however, generate sufficient force to open jaws 2 and 3 by themselves; the kingpin 11 opens jaws 2 and 3 as the trailer is moved away from the hitch 1.

To recouple the trailer, the kingpin 11 is brought into contact with the inner surfaces 32 and 34 (FIG. 2), respectively of jaws 2 and 3, thereby causing the jaws 2 and 3 to rotate to the closed position illustrated in FIG. 1. As the jaws 2 and 3 rotate to the closed position, the locking wedge 6 begins to slide into an engaged position between the locking lobes 8 and 9 due to the bias of spring 14 biasing locking wedge 6 to the engaged position. As the locking wedge 6 moves towards the jaws 2 and 3, roller/pin 26 engages a series of steps 35 (FIG. 4) in angled slot 28. The steps 35 and roller/pin 26 together form a ratchet type mechanism and retain the locking wedge 6 and prevent the locking wedge 6 from disengaging from the open/locking area 7 between locking lobes 8 and 9 of jaws 2 and 3. Once the locking wedge 6 is in the fully engaged position (FIG. 1), roller/pin 26 engages one of the steps 35, thereby preventing the locking wedge 6 from shifting out of engagement with locking lobes 8 and 9.

As the components of the fifth wheel hitch 1 begin to wear, the locking wedge 6 will tend to move further into the locking area 7 between the locking lobes 8 and 9. However, the fifth wheel hitch 1 provides for automatic seating of the lock wedge 6 in the correct position. As the components wear, the wedge 6 automatically moves further as required, and the roller/pin 16 engages a step 35 (FIG. 4) in angled slot 28 to retain the locking wedge 6 in a tightly engaged position in contact with locking lobes 8 and 9.

The fifth wheel hitch 1 of the present invention automatically couples to either a new kingpin or a worn kingpin due to the self-adjusting features of the hitch 1 discussed above. Thus, the hitch 1 can be used with different trailers having kingpins of different sizes without requiring manual adjustment by the user.

The invention claimed is:

1. A hitch assembly for releasably coupling to a kingpin of a trailer, the hitch assembly comprising:
a hitch plate structure defining a forward portion and a rear portion having a throat with tapered sidewalls;
first and second jaw members rotatably mounted to the hitch plate structure for movement between an open position wherein distal portions of the first and second jaws are spaced apart to permit a kingpin to be received between the distal portions of the first and second jaws, and a closed position wherein the distal portions of the first and second jaws are proximate one another to form a kingpin-receiving space; and wherein the first and second jaws define locking surfaces that generally face one another and define a lock-receiving space therebetween;
a locking member movably mounted to the hitch plate structure for movement in a first direction from a disengaged position permitting positioning of the first and second jaw members in the open position, towards a plurality of engaged positions in which a portion of the locking member is positioned between the locking surfaces of the first and second jaws when the first and second jaws are in the closed position, and wherein the locking member prevents rotation of the first and second jaws from the closed position to the open position when the locking member is in an engaged position, and wherein the locking member is biased towards the engaged positions;
a release member operably connected to the locking member such that movement of the release member moves the locking member from any of the plurality of engaged positions to the disengaged position to permit rotation of the first and second jaws from the closed position to the open position whereby a kingpin can be moved between the distal portions of the first and second jaws; and:
a releasable ratchet mechanism having engaged and released configurations and permitting movement of the locking member in the first direction when the releasable ratchet mechanism is in the engaged configuration, and substantially preventing movement of the locking member in a second direction that is opposite the first direction when the releasable ratchet mechanism is in the engaged configuration such that the releasable ratchet mechanism retains the locking member in a selected one of the plurality of engaged positions.

2. The hitch assembly of claim 1, wherein:
the ratchet mechanism comprises an engagement member that engages a plurality of notches disposed on the release member, and wherein the engagement member engages a selected one of the notches when the locking member is in a corresponding one of the engaged positions.

3. The hitch assembly of claim 2, wherein:
the release member is movably mounted to the hitch plate structure for substantially linear motion in a third direction that is transverse to the first direction;
the release member includes an elongated slot defining inwardly-facing first and second opposed surfaces, wherein the elongated slot extends at an acute angle relative to the third direction; and wherein:
the notches of the ratchet mechanism are formed on the first opposed surface of the slot.

4. The hitch assembly of claim 3, wherein:
the inwardly-facing first and second opposed surfaces are generally parallel to one another.

5. The hitch assembly of claim 3, wherein:
the release member comprises a plate, and wherein the slot is formed in the plate.

6. The hitch assembly of claim 3, wherein:
the engagement member is disposed in the slot, and the slot includes first and second opposite ends, and includes a retaining notch in the second opposed surface at the second opposite end, and wherein the engagement member engages the retaining notch to thereby retain the locking member in the disengaged position.

7. The hitch assembly of claim 6, wherein:
the engagement member comprises a pin extending from the locking member.

8. The hitch assembly of claim 3, wherein:
movement of the release member in the third direction tends to cause the engagement member to disengage from the notches.

9. The hitch assembly of claim 8, wherein:
the release member is biased for movement in a direction opposite the third direction.

10. The hitch assembly of claim 1, wherein:
the first and second jaw members include cam lobes forming the locking surfaces.

11. The hitch assembly of claim 10, wherein:
the first and second jaw members pivot about first and second axes, respectively, and wherein the distal portions of the first and second jaw members are disposed opposite the cam lobes such that the cam lobes move towards one another as the distal portions of the first and second jaws move away from one another as the first and second jaws rotate in a first direction, and vice-versa.

12. The hitch assembly of claim 1, wherein:
the locking member includes a tapered end portion that engages the locking surfaces of the first and second jaw members when the locking member is in an engaged position.

13. A hitch assembly for releasably coupling to a kingpin of a trailer, the hitch assembly comprising:
a kingpin having a generally cylindrical outer surface defining a diameter;
a hitch plate structure defining a forward portion and a rear portion having a throat with tapered sidewalls;
first and second jaw members rotatably mounted to the hitch plate structure for movement between an open position wherein distal portions of the first and second jaws are spaced apart to define a gap that is at least about as large as the diameter of the kingpin to permit the kingpin to be received between the distal portions of the first and second jaws, and a closed position wherein the first and second jaws form a kingpin-receiving space and prevent movement of the kingpin from the kingpin-receiving space; and wherein the first and second jaws define locking surfaces that generally face one another and define a lock-receiving space therebetween;

a locking member movably mounted to the hitch plate structure for movement in a first direction from a disengaged position permitting positioning of the first and second jaw members in the open position, and a plurality of engaged positions wherein a portion of the locking member is positioned between the locking surfaces of the first and second jaws when the first and second jaws are in the closed position, and wherein the locking member prevents rotation of the first and second jaws from the closed position to the open position when the locking member is in one of the engaged positions, and wherein the locking member is biased towards the plurality of engaged positions;

a release member operably connected to the locking member such that movement of the release member moves the locking member from the engaged positions to the disengaged position to permit rotation of the first and second jaws from the closed position to the open position whereby the kingpin can be moved out of the kingpin-receiving space; and:

a releasable ratchet mechanism having engaged and released configurations and permitting movement of the locking member in a first direction when the releasable ratchet mechanism is in the engaged configuration, and substantially preventing movement of the locking member in a second direction that is opposite the first direction when the releasable ratchet mechanism is in the engaged configuration such that the ratchet mechanism retains the locking member in a selected one of the plurality of engaged positions.

14. The hitch assembly of claim 13, wherein:

the ratchet mechanism comprises an engagement member plurality of notches disposed on the release member, and wherein the engagement member engages a selected one of the notches when the locking member is in a corresponding one of the engaged positions.

15. The hitch assembly of claim 14, wherein:

the release member is movably mounted to the hitch plate structure for substantially linear motion in a third direction that is transverse to the first direction;

the release member includes an elongated slot defining inwardly-facing first and second opposed surfaces, wherein the elongated slot extends at an acute angle relative to the third direction; and wherein:

the notches of the ratchet mechanism are formed on the first opposed surface of the slot.

16. The hitch assembly of claim 15, wherein:

the inwardly-facing first and second opposed surfaces are generally parallel to one another.

17. The hitch assembly of claim 15, wherein:

the release member comprises a plate, and wherein the slot is formed in the plate.

18. The hitch assembly of claim 15, wherein:

the engagement member is disposed in the slot, and the slot includes first and second opposite ends, and includes a retaining notch in the second opposed surface at the second opposite end, and wherein the engagement member engages the retaining notch to thereby retain the locking member in the disengaged position.

* * * * *